United States Patent [19]

Schultz

[11] 4,105,109
[45] Aug. 8, 1978

[54] SCRAPER CLEANING APPARATUS FOR ENDLESS CONVEYOR BELT

[76] Inventor: John J. Schultz, 8405 S. Winslow Rd., Palos Park, Ill. 60464

[21] Appl. No.: 774,418

[22] Filed: Mar. 4, 1977

[51] Int. Cl.² .......................................... B65G 45/00
[52] U.S. Cl. ............................................... 198/499
[58] Field of Search ............... 198/494, 495, 496, 497, 198/498, 499

[56] References Cited

U.S. PATENT DOCUMENTS

| 2,545,882 | 3/1951 | Hall | 198/499 |
|---|---|---|---|
| 2,545,883 | 3/1951 | Hall | 198/499 |
| 2,909,272 | 10/1959 | Kercman et al. | 198/497 |
| 3,342,312 | 9/1967 | Reiter | 198/499 |
| 3,722,667 | 3/1973 | Olson | 198/499 |
| 3,860,106 | 1/1975 | Cooley | 198/781 |
| 3,913,728 | 10/1975 | Pott | 198/498 |
| 3,952,863 | 4/1976 | Schattauer | 198/498 |
| 3,957,155 | 5/1976 | Enchelmaier | 198/496 |
| 3,994,388 | 11/1976 | Reiter | 198/499 |
| 4,036,351 | 7/1977 | Reiter | 198/499 |

FOREIGN PATENT DOCUMENTS

| 826,420 | 1/1952 | Fed. Rep. of Germany | 198/499 |
|---|---|---|---|
| 1,265,652 | 4/1968 | Fed. Rep. of Germany | 198/497 |
| 1,953,493 | 5/1971 | Fed. Rep. of Germany | 198/497 |
| 2,058,309 | 5/1973 | Fed. Rep. of Germany | 198/499 |
| 1,075,502 | 7/1967 | United Kingdom | 198/499 |

*Primary Examiner*—Evon C. Blunk
*Assistant Examiner*—Richard K. Thomson
*Attorney, Agent, or Firm*—McCable, Lucas & Brugman

[57] ABSTRACT

A scraper apparatus for cleaning the operating surface of an endless conveyor belt is disclosed as mounted in scraping engagement with the belt's operating surface for limited pivotal swinging movement from a belt engaging position to a safety and maintenance position. The apparatus has a biasing portion formed as a pressurized bladder carried by a support member mounted transversely of the belt which individually biases each member of an aligned series of scraper blades into continuous scraping engagement with the belt so as to locally compensate for worn belt areas and worn scraper blades or for obstructions on the belt occurring at one scraper blade without preventing or disturbing continued scraping action of the next adjacent scraper blades. Such localized biasing maintains a constant scraping pressure at each scraper blade and allows the series of scraper blades to float with the belt as it rises and sags with tension variations. The separate scraper blades are readily replaceable without removal of associated fasteners.

5 Claims, 6 Drawing Figures

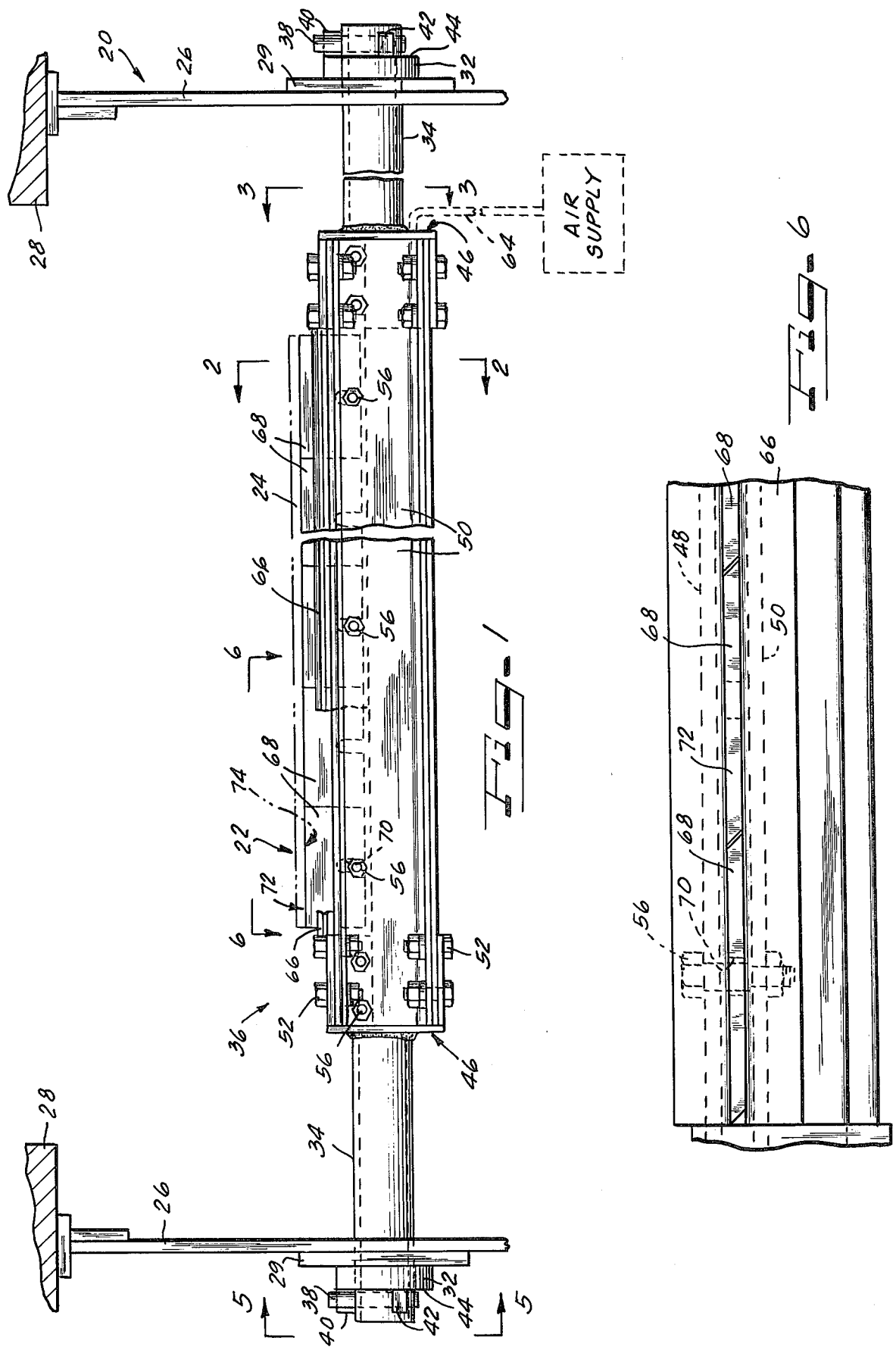

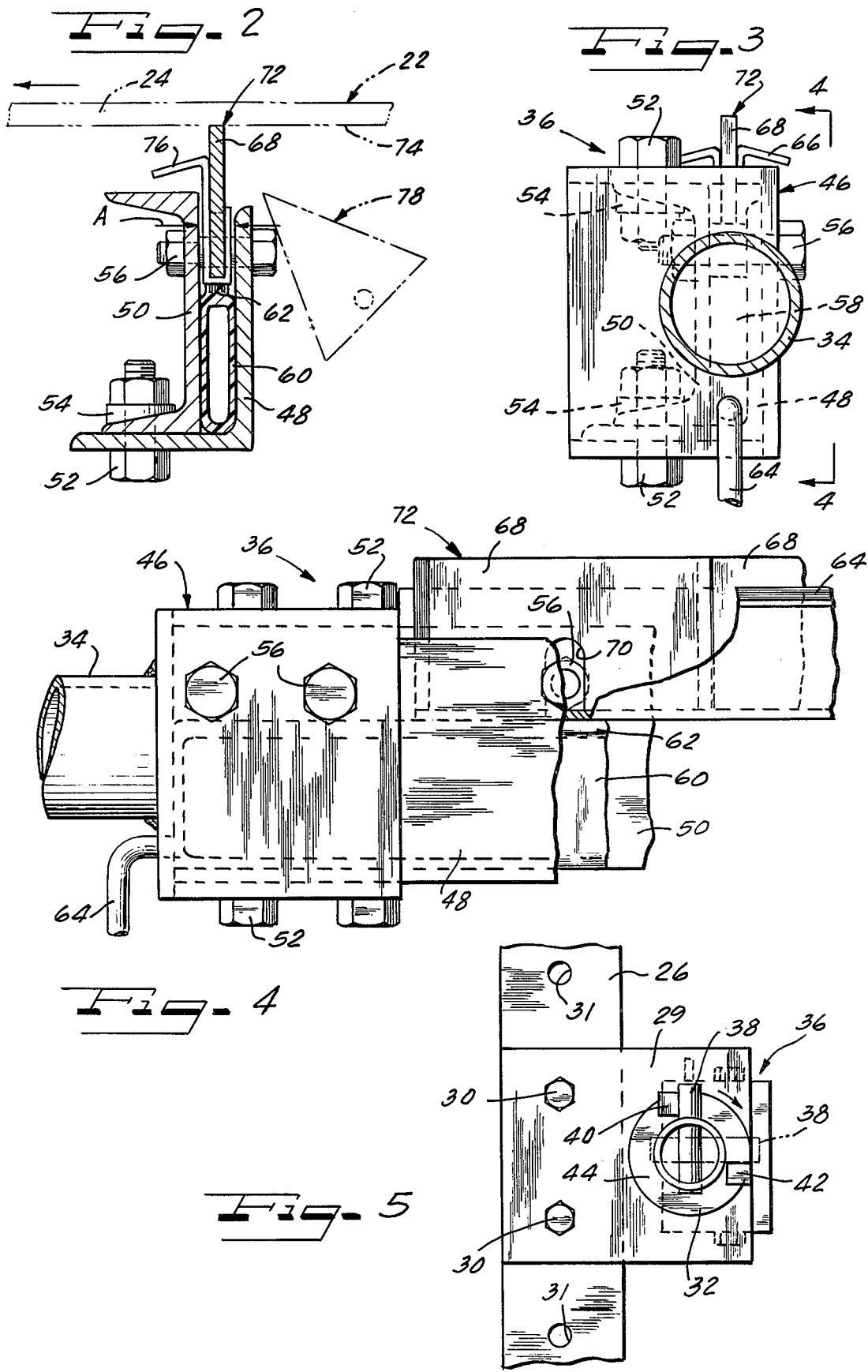

SCRAPER CLEANING APPARATUS FOR ENDLESS CONVEYOR BELT

BACKGROUND OF THE INVENTION

1. Field of the Invention

This invention relates to endless belt conveying systems and more particularly to scraper cleaning devices used in connection therewith.

2. Description of Prior Art

Endless conveyor belts made of fabric, rubber, synethetic materials, and the like are commonly employed to convey various powdered, bulk, and aggregate materials, eg. mineral ores, chemicals, sand or coal, from an input soruce to a delivery station. A typical installation includes an endless belt trained over two rotating drums with a cleaning mechanism or scraper device located at a cleaner station intermediate the drums on the endless belt loop's return side or adjacent the belt's discharge end. The scraper device is utilized, of course, to remove any conveyed material tending to cling to the belt after discharge. A build up of such adhered material can, of course, cause belt wear and faulty belt tracking, can require extra power to drive the belt, and can effect the belt's capacity to convey material.

Various prior art belt cleaning devices have been utilized to eliminate particulate and other type materials from adhering to conveyor belts, but these devices have met with limited success. A common prior art scraper cleaner comprised a series of blades — sometimes angled relative to the direction of belt travel and other times aligned in one or more rows transversely thereof — rigidly carried by an elongate support member which itself was biased by counterbalancing weights or springs to effect scraping engagement of the entire series of blades as a unit against the conveyor belt. Another similar prior art device included a single blade mounted substantially transversely of the belt and rigidly supported by a carrier which itself was biased towards the belt at its two ends by a coil spring and shaft type of biasing member.

However, because of the type of biasing used, neither of these prior art devices provided means for continuously assuring scraping engagement across the conveyor belt's operating surface, viz. any local immovable obstruction on the belt would bias the rigidly supported blade or blade series away from the belt. Additionally, if the belt had localized wear areas occurring on its surface, no scraping of the worn areas would occur as the prior art devices provided no localized biasing of any individual scraper element or even of the series of scraper members.

Another problem encountered with utilization of cleaning devices of the prior art is that occasionally a conveyor belt will inadvertently reverse, such as during a power failure or when the conveyor belt drive system's safety brakes fail. This is especially prevalent when the belt is operating on a steep incline and a massive weight of conveyed material is on the belt. Two problems arise then with an unexpected belt reversal; these are due primarily to the tendency of the prior art devices to continuously bias the scraper elements against the belt. First, damage could occur to the belt itself in the form of a rip in the belt's splice if the splice is forcibly dragged in a reverse direction back past the cleaner's blades. Secondly, the prior art cleaner device itself could be damaged, as they were typically designed to function and withstand forces in the normal operating direction only.

Yet another problem associated with prior art belt cleaning devices is the fact that the majority of them had to be mounted adjacent a tightened portion of the belt where vertical belt movement was limited, such as near a belt's delivery drum on the return belt portion, or near a belt's so-called snub drum.

Examples of the prior art typifying the foregoing problems are illustrated in U.S. Pat. Nos. 1,875,442; 3,315,794; and 3,999,649.

SUMMARY OF THE INVENTION

The scraper cleaning mechanism for an endless conveyor belt of the present invention is a series of individual scraper blades which are individually biased into scraping engagement with their respective contact areas of the belt's operating or carrying surface by a biasing member preferably taking the form of an elongated pressurized air-filled bladder resiliently supporting each scraper blade. The bladder is supported and contained adjacent the belt's operating surface by a carrier member which itself is mounted for limited swinging pivotal movement on an axis extending transversely of the belt, from a normal operating position to a safety and maintenance position. The bladder can be conveniently connected to a standard plant air source, or to a separate tank controlled by a common regulator valve.

The fact that the scraper assembly can pivot out of engagement from the conveyor belt, due to the limited swinging capability of the carrier member, allows easy access to the individual scraper elements and to the biasing member. Additionally, as a preventative or safety feature, the capability of such pivotal movement is advantageous in allowing the entire belt cleaner assembly to swing out of the way when an unexpected reverse of the conveyor belt occurs.

The bladder member is capable of effecting localized biasing of each scraper blade thereby assuring continuous, localized scraper blade engagement with the belt. Thus, due to such effective localized biasing, regardless if a belt is excessively worn at a local zone across its face, or if an immovable object adhering to the belt engages a particular scraper blade, or if a particular blade is unusually worn, the biasing member allows that particular blade to compensate for such conditions and either be biased further into or away from scraping engagement with the belt as the situation dictates, yet without affecting the scraping action of the rest of the blades.

Furthermore, the abutting edges of each of the scraper blades are correspondingly beveled so that they present, aligned transversely of the belt's surface, a substantially continuous scraping edge without any troublesome gaps. A deflector shield is mounted adjacent the aligned scraper blades to prevent any removed particles of the conveyed material from entering and fouling the various components of the scraper device. Alternatively, a portion of the deflector shield can be removed and an additional, intermittently-pulsed, air blow-off plenum utilized to forcibly remove any particle build up that adheres to the scraper blades.

The advantageous slotted design of the scraper components of the present invention and the fact that the fasteners associated with the carrier member are used only as spacer members allows the scraper blades to be readily removed and replaced without loosening any fasteners.

Moreover, because of the relatively vertical flexibility of the scraper components of the present invention, and their ability to compensate for or "float" with sagging belt portions, the scraper device disclosed herein can be mounted at practically any convenient operating position rather than being limited to those positions where the belt is relatively tight.

Accordingly, one of the primary objects of this invention is to provide a scraper cleaning mechanism for a conveyor belt which is capable of maintaining a continuous scraping edge across the entire belt operating surface regardless of localized belt unevenness, scraper blade wear, or obstructions.

It is another object of this invention to provide a belt cleaner device capable of both automatically pivoting out of engagement with the belt in the event of unexpected belt reversal or being manually pivoted to provide convenient access for maintenance of component parts.

It is a further object of this invention to provide a belt scraper cleaner that has a biasing member that can be conveniently operated by a commonly available pressurized air source.

It is still another object of this invention to provide a biasing member for a conveyor belt scraper mechanism which will allow an entire series of scraper blades and also the individual blades themselves to continuously and uniformly engage or float against the belt regardless of belt surface variations.

It is a still further object of this invention to provide a belt scraper device that allows for removal and replacement of individual scraper blade elements without loosening any associated fastener elements.

The means by which the foregoing and other objects of the present invention are accomplished and the manner of their accomplishment will be readily understood from the following specification upon reference to the accompanying drawings, in which:

FIG. 1 is a front elevational view of the belt scraper cleaning device of the present invention shown in a typical operational setting, with certain elongated sections broken out;

FIG. 2 is a side sectional view of the scraper device of FIG. 1 taken along line 2—2 thereof, depicted as partially modified with auxiliary components in phantom;

FIG. 3 is a sectional view of a portion of the scraper device of FIG. 1 taken along line 3—3 thereof;

FIG. 4 is a fragmented rear elevational view of a portion of the scraper device taken along line 4—4 of FIG. 3;

FIG. 5 is an end view of a mounting support portion of the scraper device taken along line 5—5 of FIG. 1, with different operational positions of certain components shown in phantom; and FIG. 6 is a plan view of the blade portion of the scraper device taken along line 6—6 of FIG. 1. de

DESCRIPTION OF THE PREFERRED EMBODIMENT

Having reference to the drawings wherein like reference numerals indicate corresponding elements, there is shown in FIG. 1 an illustration of the preferred embodiment of the belt scraper cleaning device of the present invention, generally indicated by reference numeral 20, shown in a typical operation setting. In a well known manner, an endless conveyor belt indicated generally by reference numeral 22 is trained about two rotating drums (not shown) which support and drive the belt between a delivery station or tail end and a discharge station or head end (neither shown). For purposes of describing the present invention it is sufficient to note that the cleaning device 20 is stationed adjacent the discharge end of the belt 22 at the lower or return portion 24 of the endless loop making up belt 22. It will be understood, of course, that the device 20 can be stationed at various other positions depending upon the specific operating requirements of the conveyor system without affecting the present invention's advantageous operations.

A pair of mounting arms 26, 26 are rigidly fastened at their upper ends to a frame 28 which supports one of the rotating drive drums (not shown), and at their lower ends provide support and journalling, through a pair of mounting plates 29, 29 and a pair of collars 32, 32, to a pair of concentrically aligned tube members 34, 34 which are rigidly fastened, such as by welding, to each end of a belt scraper unit generally denoted by reference number 36. It will be understood that the mounting plates 29, 29 are rigidly fastened to the mounting arms 26, 26 through use of threaded fasteners 30 in conjunction with an appropriately selected set of holes 31, 31 on mounting arms 26, 26 such that the scraper unit can be positioned substantially adjacent the belt return position 24. As will be described in detail later herein, a pair of pins 38, 38 are force-fit laterally through mating holes (not shown) formed in the outer ends of tubes 34, 34 exteriorly of collars 32, 32 and are adapted, when the rigidly joined scraper unit 36 and tube members 34, 34 are rotated, to engage either of two pairs of stop blocks 40, 40, and 42, 42 which are rigidly fastened, such as by welding, to the exterior surfaces 44, 44, of the collars 32, 32.

As best seen in FIGS. 1, 3, & 4, the belt scraper unit 36 comprises two end cap portions 46, 46 (preferably formed from welded sections of sheet metal) to which the tube members 34, 34 are respectively welded or otherwise rigidly fastened, an elongate angle member 48 (preferably formed from a section of angle iron), and an elongate channel member 50 (preferably formed from a section of channel iron). The ends of the angle member 48 and the channel member 50 are rigidly fastened to each other and to the end caps 46, 46 by threaded fasteners 52 and spacer washers 54, while the central portions of the upstanding portions of angle 48 and channel 50 are maintained together in appropriate spaced relation by several spacer bolt fasteners 56. The assembled angle 48 and channel 50 form a recessed, channel-shaped chamber 58 in which a flexible, air-actuated bladder 60, preferably formed of a neoprene-like material, is supported and contained. The flexible bladder 60 when free-standing is generally oval-shaped and has a thicker upstanding portion or upper edge 62; however, due to its resiliency, the bladder 60 takes and fills the shape of the chamber 58 when inserted therein and inflated with air through an air stem connector 64 from either a typically-available plant air supply (see FIG. 1) or a separate regulated air tank (not shown).

As best seen in FIG. 3, a series of abutting deflector shields 66 are supported — for limited vertical movement — between the interior upstanding edges of the angle 48 and channels 50 by the upper edge 62 of bladder 60. The shields are preferably formed from sheet metal. A series of specially configured scraper blades 68 are adapted to be inserted one each into the respective interior recesses formed by deflector shields 66, and are supported thereby. As best seen in FIG. 4, a slot 70 is formed in the lower region of each blade 68 to allow the blade 68 to move vertically in relation to the shank of the spacer bolts 56; a similar slot (not shown) is formed in the lower region of each deflector shield 66 for a similar purpose. It will be understood that while each blade 68 and shield 66 are preferably formed with a slot, the use of a spacer bolt on every second (see FIG. 1) or third blade 68 is sufficient to maintain the requisite space — indicated by reference letter A in FIG. 2 — between the upstanding edges of angle 48 and channel 50.

The ends of each blade (see FIG. 6) and associated shield 66 (not shown) are beveled so that when the blades 68 are aligned in abutting relation they present a substantially continuous scraping edge 72 to the operating or carrying surface 74 of belt 22. It will be understood by those skilled in the art that the scraper blades 68 can be formed from various materials including somewhat flexible materials, such as solid urethane rubber and fabric reinforced rubber, or metallic materials, such as stainless and tungsten-carbide steels, or teflon, or even a ceramic material; this, of course depends on the particular belt cleaning situation encountered (corrosiveness, abrasiveness, belt type, belt speed, etc.)

A partial modification to the structure, but not the concept, of the present invention is shown in FIG. 2 (as compared with FIG. 3). The specially configured deflector shield 76 in FIG. 2 is similar in all respects to shield 66 in FIG. 3 except that one of the outwardly extending deflector portions — to the right in FIG. 2 — is removed to allow effective use of an intermittent air blast from an air plenum, generally depicted by reference numeral 78 in FIG. 2, that is intermittently time-pulsed — preferably at approximately 80 PSI — by the same air supply providing air to bladder 60. This modified version of belt scraper 20 is used in those belt cleaning situations where the additional air blast to accumulated material on the blades will significantly improve belt cleaning.

Turning now to a description of the operation of the belt scraper cleaning device 20 of the present invention, as noted above the belt scraper unit 36 is so mounted adjacent belt 22, through selected positioning of the fasteners 30 and mounting plate 29 with the mounting arms 26, that the scraper blades 68 are initially mounted in close proximity to the belt's operating surface 74. Then, when the bladder 60 is filled with air from a regulated air supply, the bladder's upper edge 62 is moved upwardly (FIG. 2) so that the blades 68 will each evenly but forcibly engage the belt surface 74, preferably at approximately 5 to 15 PSI. Stated another way, due to the fact that each blade 68 and its associated deflector shield 66 form an individual unit capable of undergoing vertical movements that are independent of the movements of the next adjacent blade and shield, each blade 68 is capable of exerting a fairly constant force on its respective scraping area on belt surface 74. This even maintenance of pressure by blades 68 on belt surface 74 allows the belt scraper cleaning device 20 to compensate for both localized belt wear occurring at one particular blade 68 and localized blade wear. Additionally, if a particular obstruction carried on the belt 22 — that is incapable of being scraped off — is present at one particular blade 68, that particular blade 68 can readily deflect downwardly (refer to FIG. 1) without affecting the scraping engagement and action of the next adjacent blades 68. It is to be understood that by regulating the air supply to bladder 60, the above-noted constant scraper blade pressure of 5 - 15 PSI can be continuously maintained, regardless even of scraper blade wear.

Normally, the scraper unit 36 operates in a vertical position (see FIGS. 1 & 2 for example) wherein the drag of the belt 22 (see direction of dotted arrow in FIG. 2) across blades 68 causes pins 38, 38 (FIG. 5) in each tube 34, 34 to be maintained against stop blocks 40, 40. However, because of the above-noted capability of limited rotation of joined unit 36 and tube members 34, 34 about collars 32, 32 on plates 29, 29, the herein-disclosed belt cleaning device 20 has two significant features. First, if perchance an inclined conveyor belt's brakes failed and a heavy load caused the conveyor belt's direction of travel to reverse, the drag of the reversed belt across the series of blades 68 would cause the joined unit 36 and members 34, 34 to automatically rotate (in the direction of the curved arrow in FIG. 5) to a safety position such that the pins 38, 38 would rotate to and stop at their dotted positions (shown in FIG. 5) against stop blocks 42, 42. In this way, any possible damage to either the scraper device 20 or the belt 22 is substantially minimized. Second, if the scraper unit 36 need be cleaned or repaired, or if a worn scraper blade 68 need be replaced, the unit 36 can be easily rotated from its normal operating (vertical) position to its maintenance (horizontal) position. Once so rotated for maintenance, a worn blade 68 can be removed and replaced easily without unfastening any spacer bolts 56, primarily because of the loose fit of each blade 68 within its associated shield 68.

Since the scraper components of the belt cleaning device 20 are capable of either singly or jointly vertically compensating for any variations in belt height, within limits, the device 20 is not limited to being operated only at positions where the belt 22 is tight, but can be located at any convenient position.

From the foregoing, it is believed that those skilled in the art will readily appreciate the unique features and advantages of the present invention over previous types of scraper cleaning devices for endless belt conveyors. Further, it is to be understood that while the present invention has been described in relation to a particular preferred and modified embodiment as set forth in the accompanying drawings and as above described, the same nevertheless are susceptible to change, variation and substitution of equivalents without departure from the spirit and scope of this invention. One such substitution would be to fashion the scraper blades in an overlapping manner into two or more lines transversely of the belt to provide the continuous scraping edge. It is therefore intended that the present invention be unrestricted by the foregoing description and drawings, except as may appear in the following appended claims.

The embodiments of the invention in which an exclusive property or privilege is claimed are defined as follows:

1. A cleaning mechanism for an endless conveyor belt comprising support means mounted transversely of an endless conveyor belt and adjacent the carrying surface thereof, a plurality of scraper elements individually mounted on said support means substantially the length thereof and adapted when biased to engage said belt carrying surface and conform to the contour thereof, and biasing means characterized as being a flexible bladder containing a pressurized medium, said biasing means mounted on said support means and operable to individually bias each of said scraper elements thereby to effect and maintain a uniform scraping engagement of each of said scraper elements with said belt carrying surface independent of the other said scraper elements.

2. The invention of claim 1, wherein said pressurized medium is pressurized air.

3. The invention of claim 1, wherein said support means includes a channel portion opening towards said belt carrying surface operable to containably support said flexible bladder means.

4. The invention of claim 3, wherein said scraper elements are adapted to be slidably received within said channel portion thereby to facilitate removal and replacement of said scraper elements therefrom.

5. A conveyor belt cleaning apparatus comprising a channel member mounted transversely of an endless conveyor belt and opening towards the carrying surface of the conveyor belt, a flexible bladder containably supported within said channel member, pressure means operable to supply a pressurized medium to said flexible bladder, and a plurality of scraper elements slidably retained within said channel member and adapted to be biased by said flexible bladder, whereby each said scraper element is operable to maintain a substantially constant scraping pressure on the belt carrying surface of the conveyor belt.

* * * * *